(12) United States Patent
Bono (10) Patent No.: US 7,886,099 B2
(45) Date of Patent: Feb. 8, 2011

(54) SYSTEMS AND METHODS FOR PROVIDING A PERSONAL COMPUTER WITH NON-VOLATILE SYSTEM MEMORY

(75) Inventor: Vincent P. Bono, Medway, MA (US)

(73) Assignee: Superspeed LLC, Sudbury, MA (US)

( * ) Notice: Subject to any disclaimer, the term of this patent is extended or adjusted under 35 U.S.C. 154(b) by 378 days.

(21) Appl. No.: 11/424,728

(22) Filed: Jun. 16, 2006

(65) Prior Publication Data
US 2007/0294463 A1    Dec. 20, 2007

(51) Int. Cl.
*G06F 13/24* (2006.01)
*G06F 13/00* (2006.01)
*G06F 11/00* (2006.01)

(52) U.S. Cl. ........................ 710/260; 711/149; 711/162; 714/24

(58) Field of Classification Search ................. 710/260; 711/149, 162; 714/24
See application file for complete search history.

(56) References Cited

U.S. PATENT DOCUMENTS

| | | | |
|---|---|---|---|
| 5,606,681 A | 2/1997 | Smith et al. | |
| 6,079,026 A * | 6/2000 | Berglund et al. | 713/340 |
| 6,336,174 B1 | 1/2002 | Li et al. | |
| 6,609,182 B1 * | 8/2003 | Pedrizetti et al. | 711/159 |
| 6,629,201 B2 | 9/2003 | Dempsey et al. | |
| 6,742,140 B2 * | 5/2004 | Caulkins | 714/24 |
| 6,842,823 B1 | 1/2005 | Olson | |
| 7,149,854 B2 | 12/2006 | Weber et al. | |
| 2002/0147916 A1 | 10/2002 | Strongin et al. | |

FOREIGN PATENT DOCUMENTS

| | | |
|---|---|---|
| EP | 0 461 924 A2 | 12/1991 |
| EP | 0 488 366 A2 | 6/1992 |
| EP | 0 488 366 A3 | 6/1992 |
| EP | 0 642 079 A1 | 3/1995 |
| EP | 0 772 136 A2 | 5/1997 |
| WO | WO 9202885 A1 * | 2/1992 |
| WO | WO 95/12848 | 5/1995 |

* cited by examiner

*Primary Examiner*—Mark Rinehart
*Assistant Examiner*—Jeremy S Cerullo
(74) *Attorney, Agent, or Firm*—Krueger Iselin LLP (57) ABSTRACT

In some embodiments, a system comprises a system memory module and an access card. The system memory module connects to a memory bus on a motherboard for a personal computer, while the access card connects to an expansion bus. The access card couples to the system memory module to provide power when the personal computer is unpowered. When the personal computer boots, the system memory module operates in a cloaked mode that hides the system memory module from a memory bus. The access card switches the system memory module from the cloaked mode to a normal mode in response to a command received via the expansion bus. For long-term power outages, the access card may copy data from the system memory module to a nonvolatile information storage device. Energy storage and nonvolatile information storage may be provided by a separate longevity unit that couples to the access card.

18 Claims, 6 Drawing Sheets

SYSTEMS AND METHODS FOR PROVIDING A PERSONAL COMPUTER WITH NON-VOLATILE SYSTEM MEMORY

BACKGROUND

Personal computers have three general tiers of memory: cache memory, system memory, and long-term storage. Cache memory is often located on the same chip as the processor to provide the highest possible performance. Cache memory is designed to offer high access bandwidth and low latency, but due to cost and space limitations, this type of memory is often relatively small. System memory, on the other hand, is somewhat larger, usually requiring the memory to be located elsewhere on the motherboard. The access bandwidth and latency of system memory are more moderate than cache memory. Both cache memory and system memory are generally implemented using a volatile memory technology, i.e., a memory technology that is unable to preserve stored information in the absence of electrical power. A common example of volatile memory technology is random access memory (RAM), such as dynamic RAM (DRAM) and static RAM (SRAM).

In personal computers, long-term storage is provided by non-volatile memory technology. Long-term storage tends to be much larger (often about 100× larger) than system memory, but also tends to suffer from a lower access bandwidth and a much higher latency. Examples of non-volatile memory include magnetic media (disk drives), optical media (compact discs), flash memory, read-only memory (ROM), and programmable ROM (PROM).

Latency and access bandwidth are factors that contribute to access time, i.e., the average time required for a processor to acquire a desired portion of data. As such, the latency values strongly affect the computer's performance. The latency of cache memory is generally on the order of a few processor clock cycles (e.g., about a nanosecond), while the latency for system memory is on the order of ten memory bus clock cycles (e.g., about fifty nanoseconds). By contrast, the latency of a high-performance hard disk drive is on the order of five milliseconds, or about 100,000 times the latency of system memory.

In many instances, latency and access bandwidth associated with long-term storage cause it to be a limiting factor in the computer's performance. Insufficient availability due to conflicting read and writes cause long-term storage to be a bottleneck in the system. Caching technology offers the ability to reduce read accesses to long-term storage. That is, caching techniques may be used to copy commonly-used data (or data that is statistically likely to be used) from long-term storage to system memory and thence to cache memory, thereby reducing the frequency with which data must be read from long-term storage.

As previously noted, however, the system memory and cache memory employ volatile memory technologies. Consequently, as data is modified and new data is generated, caching techniques provide for the prompt writing of such data back to long-term storage to minimize lost data in the event of sudden power loss. Such "write-through" caching techniques fail to reduce the number of write accesses to long-term storage. Nevertheless, there do exist "write-back" caching techniques that permit changes to data in volatile memory to accumulate, enabling multiple modifications to be represented in a single write access to long-term storage. Despite the enhanced performance offered by such techniques, they have not been widely adopted in personal computers due to the enhanced risk of data loss in the event of sudden power loss or a system crash.

Though caching techniques offer enhanced performance, there still exists an initial investment of access time to move the data from one tier to the next. The latency and access time for retrieving data from long-term storage is readily perceptible to the user. Moreover, the delay may be particularly annoying at boot-up time when the computer must copy operating system software from long-term storage, usually followed immediately by one or more additional retrieval periods to retrieve commonly-used applications that the user wishes to run and to otherwise restore the system to the state at which it was in before it was powered down.

BRIEF DESCRIPTION OF THE DRAWINGS

A better understanding of the various disclosed embodiments can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Accordingly, there is disclosed herein various systems and methods for providing a personal computer with non-volatile system memory. In some embodiments, a system comprises a system memory module and an access card. The system memory module fits in a memory bus connector on a motherboard for a personal computer, while the access card fits in an expansion bus connector on the motherboard. The access card couples to the system memory module to provide power when the personal computer is unpowered. When the personal computer boots, the system memory module operates in a cloaked mode that hides the system memory module from a memory bus. The access card switches the system memory module from the cloaked mode to a normal mode in response to a command received via the expansion bus. For long-term power outages, the access card may copy data from the system memory module to a nonvolatile information storage device, and may restore the data to the system memory module when power is restored. Energy storage and nonvolatile information storage may be provided by a separate longevity unit that couples to the access card. Such a system may serve to provide enhanced system performance by preventing power-outage-related data loss, thereby rendering many disk accesses unnecessary.

Figure 1:
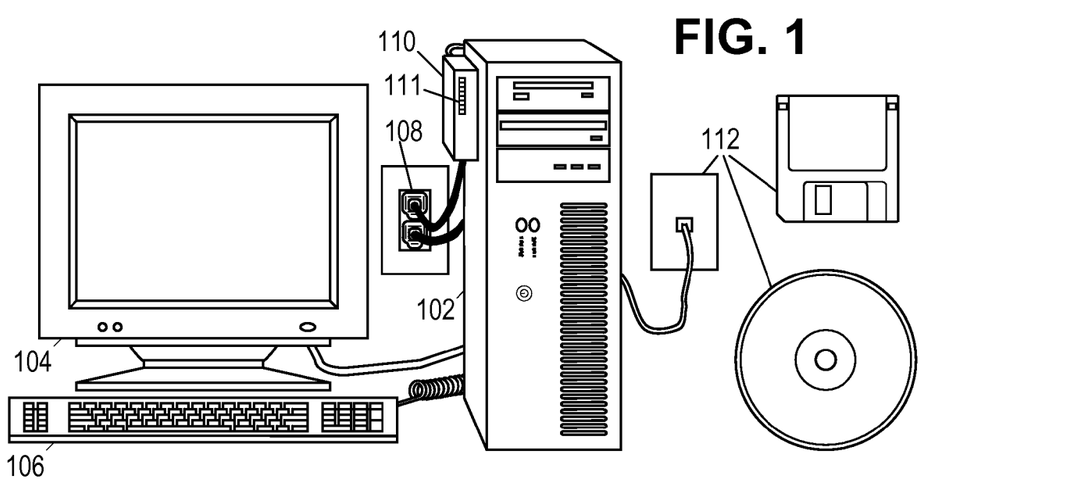
FIG. 1 is a perspective view of a personal computer system with an illustrative embodiment of enhanced system memory.

FIG. 1 shows an illustrative personal computer 102 having a display 104 and a keyboard 106 for interacting with a user. Alternative or additional input and output mechanisms may be included for interacting with a user, including a mouse or other pointing device, a keypad, a scanner, a digital camera, a microphone, speakers, a printer, and a touch-sensitive screen. The computer 102 may draw power from a power source 108 such as a wall outlet, a battery, a solar array, and/or a generator. A longevity unit 110 is also shown drawing power from the same power source 108, though in various alternative embodiments the longevity unit draws power from a different (possibly additional) power source. In some embodiments longevity unit 110 provides an outlet for receiving the power cord from computer 102, thereby avoiding the need for an extra wall outlet to supply power to longevity unit 110.

Longevity unit 110 may be designed to rest on or be attached to the chassis of computer 102, and may include a visual display 111 for indicating status. In some contemplated embodiments, the longevity unit is attached to the computer chassis with Velcro®, though double-sided tape, magnets, and screws would also be suitable fastening means. In various alternative embodiments, the longevity unit 110 is designed to attach to a display 104 or to be mounted in a drive bay of computer 102.

Also shown in FIG. 1 are various information carrier media 112 that may be used to provide computer 102 with software. Examples of information carrier media include digital communications media such as wired networks (e.g., Ethernet, the Internet) and wireless networks (e.g., Bluetooth, 802.11); magnetic media such as floppy disks; optical media such as compact disks; and integrated memory media such as RFID devices and USB drives. The software and data provided by such information carrier media may configure the computer to perform various methods disclosed herein.

Figure 2:
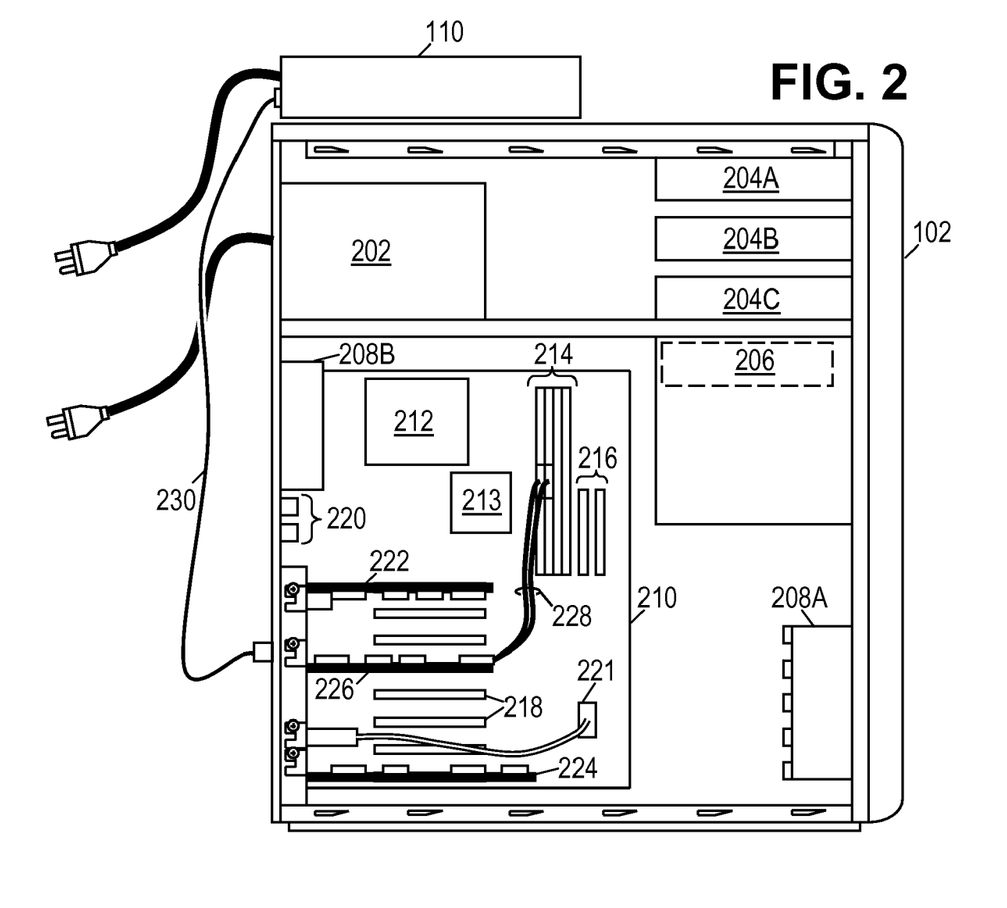
FIG. 2 is an internal view of a personal computer system with an illustrative embodiment of enhanced system memory.

FIG. 2 shows an internal view of illustrative computer 102. Computer 102 includes a power supply 202 to convert power from power source 108 to a suitable form for powering the various other components of computer 102. For example, power supply 202 may rectify and filter alternating current (AC) with peak voltages between 110 and 250 volts to provide direct current at various voltages between −15 and +15 volts.

Also included in computer 102 are one or more disk drives 204A-204C that accept removable information storage media such as floppy disks, compact disks (CDs), and digital video disks (DVDs). The removable media may be inserted into a slot or drawer that is accessible via the front of computer 102. In some embodiments, the longevity unit 110 may be configured with a standard form factor for one of these disk drives so as to be mountable in an available drive bay with indicators visible from the front of computer 102. A mounting cage is also provided for mounting one or more internal disk drives 206 such as a hard disk. One or more fans 208A, 208B are provided for drawing air through computer 102 to cool various components on motherboard 210 (discussed further below) and in power supply 202. Note that for clarity, FIG. 2 omits various wiring harnesses for coupling the power supply 202 to the disk drives 204, 206, the fans 208, and the motherboard 210, and for coupling the motherboard to the disk drives and various front panel indicators.

Motherboard 210 includes a processor 212, a bridge 213, various slots for system memory 214, disk drive connectors 216, expansion slots 218, input/output connectors 220, 221, and a slot for a graphics adapter 222. Bridge 213 couples the processor 212 to system memory 214, to a graphics adapter 222, and to a bus for communications with other computer components. Connectors 220 may accept connection cords from a keyboard, mouse and/or other input devices. Connectors 221 may be coupled to external parallel and serial connectors for coupling to a printer, scanner, and other peripheral devices. A sound card 224 is shown in one of the expansion slots 218, as is an access card 226 for controlling the enhanced system memory. Two of the system memory modules 214 are enhanced system memory modules 402, and they are shown coupled to access card 226 via communication lines 228. Another line 230 couples the access card to longevity unit 110.

Figure 3:
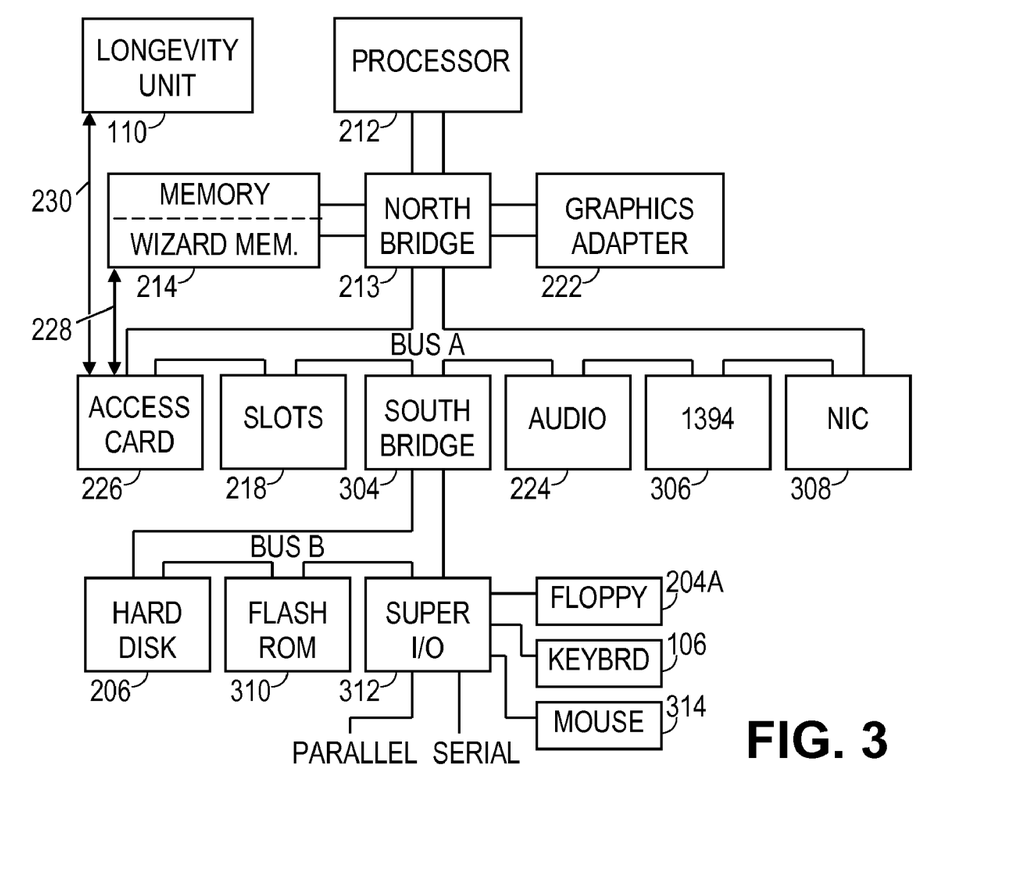
FIG. 3 is a block diagram of a personal computer system with an illustrative embodiment of enhanced system memory.

FIG. 3 shows a block diagram of the illustrative computer 102. Processor 212 couples to bridge 213 via a processor bus. Bridge 213 is usually referred to as a "North bridge" simply because it is usually depicted at the upper end of a computer system drawing. North bridge 213 also couples to a system memory 214 by a memory bus, and to graphics adapter 222 via an advanced graphics processor (AGP) bus. North bridge 213 couples processor 212, memory 214, and graphics adapter 222 to the other peripheral devices in the system through a primary expansion bus (BUS A) such as a PCI bus or an EISA bus. Various components that understand the bus protocol of BUS A may reside in slots 218 on this bus, such as sound card 224, access card 226, an IEEE 1394 interface device 306, and a network interface card (NIC) 308. As an alternative to existing on cards plugged into expansion slots 218, these components may be integrated onto the motherboard. As technology evolves and higher-performance systems are increasingly sought, there is a greater tendency to integrate many of the devices into the motherboard which were previously separate plug-in components.

If secondary expansion buses are provided in the computer system, as is typically the case, another bridge 304 is used to couple the primary expansion bus (BUS A) to the secondary expansion bus (BUS B). Bridge 304 is sometimes referred to as a "South bridge" reflecting its location with respect to the North bridge 213 in a typical computer system drawing. Various components that understand the bus protocol of BUS B may reside on this bus, such as a controller for hard disk 206, a Flash ROM 310, and a Super I/O controller 312. Additional expansion slots may be provided for plug-in components that comply with the protocol of BUS B. The Super I/O controller 312 typically interfaces to basic input/output devices such as a keyboard 106, a mouse 314, a floppy disk drive 204, a parallel port, a serial port, and sometimes various other input switches such as a power switch and a suspend switch. Flash ROM 310 stores a basic input/output system (BIOS) that is accessed by processor 212 to configure the computer during the boot process.

Processor 212 can retrieve software instructions and data from various computer components, including hard disk 206, Flash Rom 310, floppy drive 204, and network interface card 308. The software instructions and data may be stored in system memory 214 for quick access. Processor 212 executes the software instructions, which configure the processor to receive input from a user and to provide information to the user via graphics adapter 222 (which is coupled to display 104). The processor may further provide commands and data to the various system components in response to the software instructions.

Memory 214 is shown divided into two regions: normal system memory and enhanced ("wizard") system memory. The enhanced system memory is coupled to access card 226 via communications line 228, and the access card in turn is coupled to the longevity unit 110 via communications line 230. When enabled, the enhanced system memory modules are usable by the computer system in the same manner as normal system memory, i.e., for reading and writing data via the memory bus and North bridge 213. When disabled, the enhanced system memory modules are "invisible" to the computer system. In other words, attempts to detect the enhanced system memory modules are blocked, and any read or write accesses to the enhanced system memory via the memory bus are ignored. In a memory with interface registers (e.g., for latching access commands from the bus), the memory accesses may be blocked by suppressing the latch command for the registers. For memories without such interface registers, logic gates may be used to block signals from the bus. It is noted that memory modules are commonly provided with a Serial Presence Detect ("SPD") read-only memory (ROM) that makes data regarding the various memory operating parameters accessible to a computer's BIOS in accordance with the JEDEC Standard No. 21-C §4.1.2. Access to this ROM may be similarly blocked while the enhanced system memory is cloaked.

Because the enhanced system memory modules are rendered invisible to the computer system, low-level operations in the computer (e.g., power-on self-test ("POST") and boot processes) may be prevented from corrupting data stored in the enhanced system memory. Once the processor has begun executing the proper software, it may communicate with the access card 226, which in turn enables the enhanced system memory by sending a command via line 228. In some embodiments, the processor may also communicate with the access card 226 to have the enhanced system memory disabled, e.g., before entering a low-power state.

Longevity unit 110 is coupled to access card 226 to provide power to the access card 226 and to the enhanced system memory while the computer 102 is unpowered. The data stored in enhanced system memory is preserved there until longevity unit 110 runs low on energy. The longevity unit 110 may be designed to supply power to access card 226 and the enhanced system memory for a period well in excess of any anticipated power outages. For example, the longevity unit 110 may be designed to supply power for at least 24 hours, and preferably for more than four days. In some embodiments, the longevity unit 110 may be designed to supply power for a week or more.

If the longevity unit 110 should detect that it is running low on energy, it retrieves the data from enhanced system memory and stores the data in a non-volatile storage medium such as a Flash ROM or a hard disk drive, to be restored to the enhanced system memory when power returns. In an alternative embodiment, the longevity unit 110 automatically stores the data from enhanced memory in a non-volatile storage medium after a predetermined period without power, but continues to maintain the data in memory so long as sufficient energy remains. In some instances the predetermined period may be very short, e.g., essentially zero, whereas in other instances, the predetermined period may be longer than a three day weekend (e.g., 87 hours from 5 pm on Friday to 8 am on Tuesday). In those embodiments where the non-volatile storage and energy storage requirements permit, the longevity unit 110 may be integrated onto the access card 226.

Figure 4:
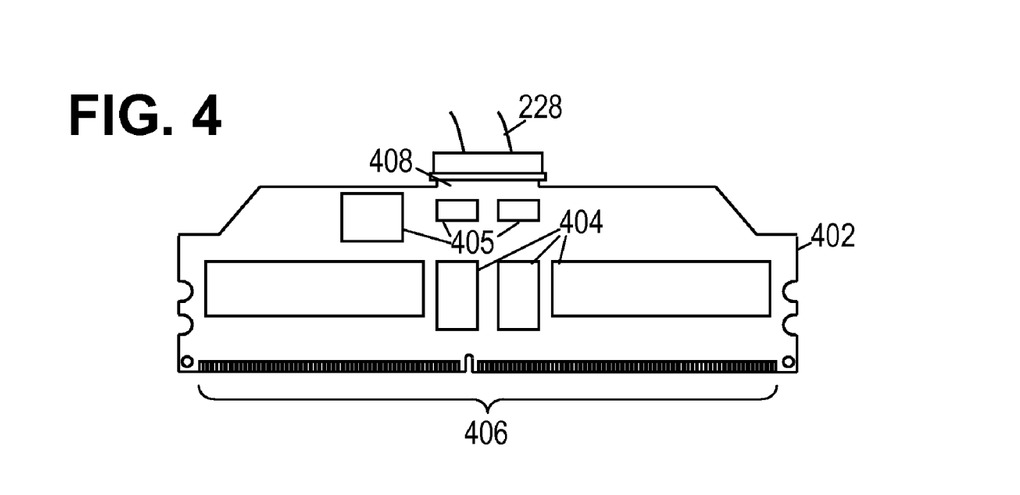
FIG. 4 shows an illustrative embodiment of an enhanced system memory card.

FIG. 4 shows an illustrative enhanced memory module 402. The enhanced memory module is a printed circuit board complying with a standard form factor insofar as needed to fit in a system memory slot. In some embodiments, the standard form factor is a DDR2 standard 240-pin form factor. The illustrative enhanced memory module 402 carries a set of integrated circuits 404 for implementing the standard memory and interface functions, augmented by one or more integrated circuits 405 to implement a "cloaking" function and to interface with the access card 226. A standard system memory connector 406 is provided for fitting into a system memory slot, and an access connector 408 is provided for connecting to communications line 228. Communications line 228 may be a 14-conductor ribbon cable suitable for supplying power and carrying Lattice High Speed PAL Serial I/O protocol (also termed the SERDES protocol) communications to access card 226. Enhanced system memory module 402 receives power via connector 408, and may additionally receive power via connector 406 while computer 102 is powered-on.

Figure 5:
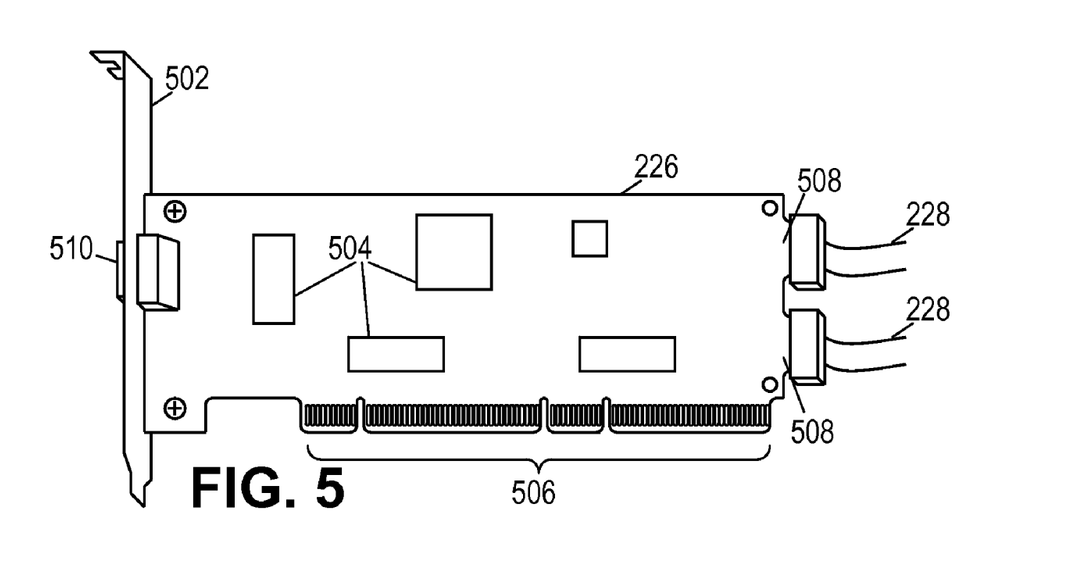
FIG. 5 shows an illustrative embodiment of an access card for enhanced system memory.

FIG. 5 shows an illustrative access card 226. The access card 226 is a printed circuit board complying with a standard form factor for fitting in an expansion card slot. To that end, the access card 226 includes a bracket 502 that attaches to the back of computer 102 and an expansion slot connector 506 that fits in an expansion slot 218. Memory module connectors 508 are provided for connecting to enhanced memory modules 402 via communication lines 228, and an external connector 510 is provided for interfacing to longevity unit 110 via line 230. A set of integrated circuits 504 on access card 226 are configured to implement interface functions with the expansion bus, with enhanced system memory modules 402, and with longevity unit 110. In addition, the integrated circuits 504 operate to control the enhanced memory modules in response to commands received via the expansion bus and in response to conditions detected via the expansion bus and via communications line 230.

Figure 6:
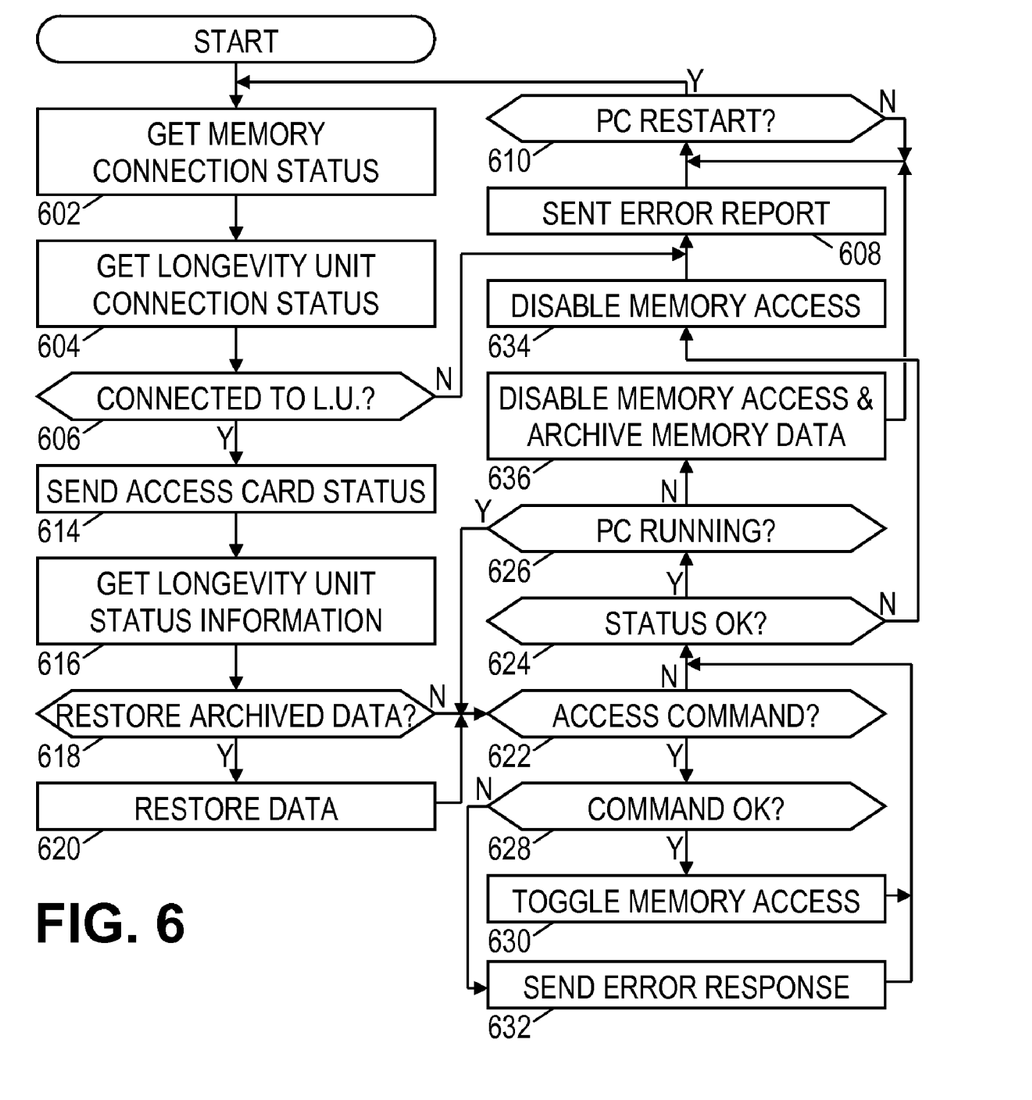
FIG. 6 shows a flow diagram of an illustrative enhanced system memory control method.

FIG. 6 shows an illustrative method that may be implemented by access card 226 to provide computer 102 with cloaked non-volatile system memory. When power is first supplied to access card 226, the access card begins carrying out the method with block 602. In block 602, the access card 226 initializes communications via connectors 508 to determine which, if any, are coupled to enhanced system memory modules 402. If the enhanced system memory modules are not disabled by default, they may be actively disabled at this time. In block 604, the access card 226 initializes communications via connector 510 to determine if it is coupled to a longevity unit. If no longevity unit is connected, the access card signals an error condition in block 608. The error condition 608 may simply be the setting of a flag in a status register for the processor 212 to read at some future time, or it may additionally involve the assertion of an interrupt to actively alert the processor 212 to the error condition. In block 610 the access card enters a wait state to wait for the next restart of computer 102. Such a restart causes the method to resume in block 602.

If, in block 606, a longevity unit is found, then in block 614 the access card 226 transmits status information to the longevity unit, which may then visually indicate the appropriate status via indicators 111. In block 616 the access card receives status information from the longevity unit. In some embodiments, the longevity unit status information includes battery charge level (or some other measure of energy storage), whether the longevity unit ran out of energy since the last time the computer lost power, and whether the longevity unit has archived any memory data in non-volatile memory.

In block 618, the access card determines whether any archived data needs to be restored to enhanced system memory. Such restoring would be needed if, e.g. the longevity unit 110 ran out of energy while the computer 102 was still without power. If it is needed, then in block 620 the access card 226 retrieves data from the longevity unit via line 630 and writes it to the appropriate enhanced memory modules via lines 628.

Once the restoring is complete, or if it is not needed, the access card enters a loop including test steps 622, 624, and 626. In block 622, the access card checks to determine if an access command has been received via the expansion bus. If not, then in block 624 the access card checks to determine if the card status is OK. If so, then in block 626, the access card checks to determine whether the computer 102 is still powered on. If so, the loop repeats.

If in block 622 a command is received, a check is made in block 628 to verify that the command is valid. The command that is received via the expansion bus is expected to be in the form of a data word written into a control register on access card 226. To prevent accidental activation, the access card may require the data word to have a specific pattern before it is recognized as a valid access command. If the command is valid, then in block 630 the enhanced system memory access state is toggled. That is, if the enhanced system memory is disabled ("cloaked"), the enhanced system memory becomes enabled so that the computer 102 can access the enhanced system memory via the memory bus. Conversely, if the enhanced system memory is enabled, it becomes disabled, rendering the enhanced system memory undetectable via the memory bus. The access card 226 then returns to the test loop.

If the access command is invalid, in block 632 the access card 226 signals an error by setting the appropriate flag in a status register and/or asserting an interrupt to the processor 212. Then access card 226 then returns to the test loop.

In block 624 the access card 226 determines whether the card status is OK. The access card may monitor the connections to the enhanced system memory modules and to the longevity unit, and may detect any break in the communications with these components. Moreover, the access card may poll the status of these components for any failures or errors detected by the components, and may monitor itself for faults. Such faults may take the form of parity errors, watchdog timer overflows, or excessive communications errors between components. If such errors or faults are detected, the access card 226 disables the enhanced system memory in block 634 and sends an error report in block 608.

In block 626 the access card 226 determines whether the computer 102 has lost power. If so, then in block 636 the access card disables the enhanced system memory modules (i.e., puts them in a "cloaked" mode), and archives the data from the enhanced system memory modules to the nonvolatile storage in longevity unit 110. In some embodiments, the archiving occurs immediately. In other embodiments, the archiving occurs after a predetermined period elapses without power being supplied to computer 102. If power is restored before the longevity unit has exhausted its energy supply, the access card returns to block 602 (or optionally to the test loop 622-626). In still other embodiments, the archiving occurs only when the longevity unit 110 determines that less than a predetermine amount of stored energy remains.

In each of these embodiments, power is supplied to the enhanced system memory modules to preserve the data for as long as possible. Once power is restored to computer system 102, the method may resume with block 602, or if the longevity unit has not exhausted its energy supply, the method may resume with the test loop 622-626.

Figure 7:
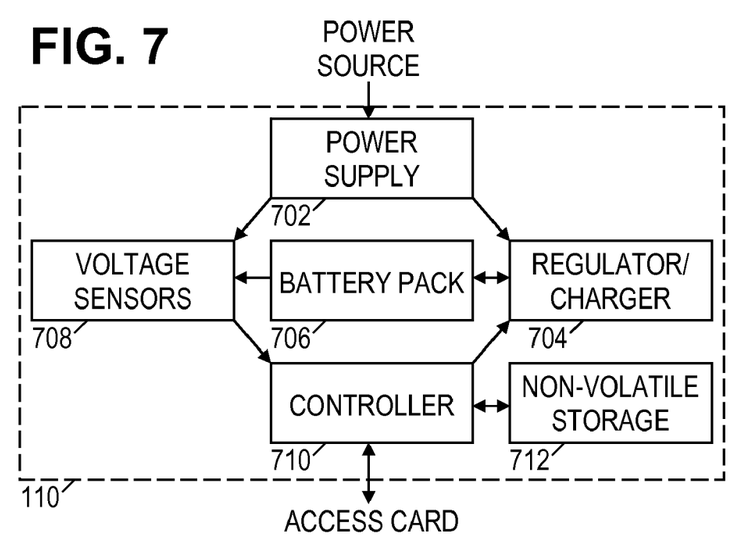
FIG. 7 shows a block diagram of an illustrative longevity unit.

FIG. 7 shows a block diagram of an illustrative longevity unit 110. The longevity unit includes a power supply 702 to receive power from power source 108 and convert the power into power suitable for supplying the other components of longevity unit 110, access card 226, and enhanced system memory modules 402. The longevity unit further includes a charging unit 704 for charging a battery pack 706 or some other form of energy storage from power supply 702. The charging unit 704 further serves as a voltage regulator to continuously supply power to access card 226 from power supply 702 or battery pack 706.

Longevity unit 110 includes voltage sensors 708 to detect the presence of power from power supply 702 and to measure the charge level of battery pack 706. A controller 710 is coupled to the voltage sensors 708 to monitor the level of energy storage and the presence or absence of power to power supply 702. Controller 710 is further coupled to charging unit 704 to control the charging/discharging of battery pack 706 as needed to maintain data in enhanced system memory modules 402 for as long as possible. When it is desirable, the controller 710 stores data from the enhanced system memory modules 402 in nonvolatile information storage unit 712, and when necessary the controller restores data to the enhanced system memory modules from the nonvolatile information storage unit. Nonvolatile information storage unit 712 may be a hard disk drive, a flash memory, or a programmable ROM, but other suitable nonvolatile information storage technologies also exist.

In some embodiments, longevity unit 110 includes visual indicators 111 (FIG. 1) that reflect status information of the longevity unit 110 and access card 226. The controller 710 controls these visual indicators to reflect the appropriate status information.

Figure 8:
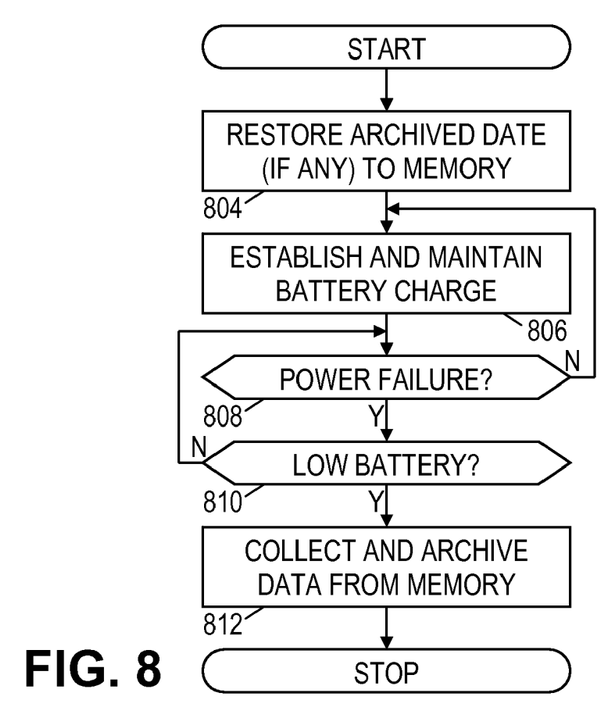
FIG. 8 shows a flow diagram of an illustrative data maintenance method.

FIG. 8 shows an illustrative method that may be implemented by controller 710. When the longevity unit 110 is powered up, it attempts to restore any archived data from nonvolatile information storage unit 712 to enhanced system memory modules 402. The attempt may fail for a number of reasons, including the absence of any archived data and the lack of a connection to an access card 226. Conversely, the attempt may succeed if data has been archived and appropriate communication lines 228 and 230 are in place. In either case, the controller 710 proceeds in block 806 to establish and maintain a store of energy in battery pack 706. This operation may involve measuring a charge level via detectors 708 and controlling the charging rate with appropriate settings of charging unit 704.

In block 808, a test is performed to determine whether power supply 702 has stopped supplying power. If not, the controller 710 loops back to block 806. Otherwise, the controller 710 begins monitoring the charge level of the battery to determine when charge exhaustion is imminent. If the battery charge is sufficient, the controller 710 loops back to block 808 to determine whether power has returned. Otherwise, in block 812 the controller 710 collects data from the enhanced system memory modules 402 and stores the data in nonvolatile storage unit 712. Thereafter the controller 710 halts until power is restored and the method commences from the beginning.

Though the flow diagrams of FIG. 6 and FIG. 8 show steps in a specific sequence, it should be recognized that the order of many steps can be re-arranged, or that many steps may be executed in parallel, with the same result. In some embodiments, the methods may be implemented by independent processes running in parallel, with the consequent result that the steps may be implemented asynchronously with changing step orders. The disclosed methods may be implemented by software or firmware running on processors or microcontrollers, or may be implemented in hardware, e.g., in the form of an application-specific integrated circuit (ASIC). Where implemented in software or firmware, information carrier media 112 (FIG. 1) may be used to provide the software or firmware to the enhanced system memory, the access card, and/or the longevity unit e.g., in the form of updates or upgrades to the system. The updates or upgrades may be written by computer 102 to the access card 226 to be stored in the memory of the relevant component.

Numerous variations and modifications will become apparent to those skilled in the art once the above disclosure is fully appreciated. For example, the access card 226 may be replaced by an access circuit integrated on the motherboard. The access circuit may be coupled to the expansion bus, or may be coupled to a configuration bus such as a JTAG or I²C bus. In some embodiments, a special-purpose signal may be used to enable the enhanced memory modules. Like the expansion buses, the configuration bus or special-purpose signal may be accessed via a bus bridge. It is intended that the following claims be interpreted to embrace all such variations and modifications.

What is claimed is:

1. A system memory module comprising:
    a bus connector that places the system memory module on a dedicated system memory bus in a personal computer when the bus connector is engaged;
    at least one volatile memory chip that couples to the dedicated system memory bus through the bus connector;
    an interface circuit configured to hide the system memory module from the dedicated system memory bus when the system memory module is in a cloaked mode, and wherein the interface circuit is configured to enable access from the dedicated system memory bus when the system memory module is in a normal mode, wherein the system memory module enters the cloaked mode when the dedicated system memory bus is unpowered, and wherein the system memory module enters the normal mode in response to a command received via the access connector; and
    an access connector that supplies power to the at least one volatile memory chip when the dedicated system memory bus is unpowered, wherein the command is communicated to the access connector via an expansion bus in the personal computer.

2. The system memory module of claim 1, further comprising:
    an interface circuit that sends a copy of data from the at least one volatile system memory via the access connector for storage in a nonvolatile memory when the system memory bus is unpowered.

3. A system for providing a personal computer with nonvolatile system memory, the system comprising:
    a system memory module having a bus connector that engages a memory bus connector of a dedicated system memory bus on a motherboard for a personal computer; and
    an access card configured to fit in an expansion bus connector on the motherboard, wherein the access card couples to the system memory module to provide power when the dedicated system memory bus is unpowered.

4. The system of claim 3, wherein the system memory module hides the system memory module from the dedicated system memory bus when the system memory module is in a cloaked mode.

5. The system of claim 4, wherein the access card switches the system memory module from the cloaked mode to a normal mode in response to a command received via the expansion bus connector.

6. The system of claim 3 wherein the access card is further configured to retrieve data from the system memory module for storage in a nonvolatile memory when the dedicated system memory bus loses power.

7. The system of claim 3, further comprising:
    a longevity unit that couples to the access card to supply power to maintain data in the system memory module for at least a predetermined period while the personal computer is unpowered, wherein the predetermined period is at least an hour.

8. The system of claim 7, wherein the predetermined period is at least a day.

9. The system of claim 7, wherein the longevity unit further comprises a nonvolatile memory that stores a copy of data in the system memory module after the personal computer becomes unpowered, and wherein the longevity unit is configured to restore the data to the system memory module after the longevity unit has exhausted its stored energy and had power restored.

10. The system of claim 7, wherein the longevity unit is external to a chassis of the personal computer.

11. A method of providing a personal computer with nonvolatile system memory, the method comprising:
    enabling a system memory module in a memory slot of a memory bus of the personal computer in response to a command; and
    maintaining power to the system memory module through a connection to an access card in an expansion slot of an expansion bus of the personal computer when the memory bus becomes unpowered.

12. The method of claim 11, wherein the command is received via an expansion bus.

13. The method of claim 11, further comprising:
    hiding the system memory module from the memory bus when the memory bus regains power.

14. The method of claim 11, wherein said maintaining includes maintaining power for at least a predetermined period while the memory bus is unpowered, wherein the predetermined period is at least an hour.

15. The method of claim 14, further comprising:
    copying data from the system memory module to a nonvolatile information storage device.

16. The method of claim 15, wherein said copying occurs at the end of the predetermined period.

17. The method of claim 15, wherein said copying occurs when a measure of stored energy falls below a predetermined threshold.

18. The method of claim 15, further comprising:
    exhausting an energy store;
    restoring power to the system memory module after said exhausting;
    copying data from the nonvolatile information storage device to the system memory module.

* * * * *